United States Patent
Grosskopf et al.

(10) Patent No.: US 7,926,381 B2
(45) Date of Patent: Apr. 19, 2011

(54) IDLER GEAR FOR A GENERATOR

(75) Inventors: Andrew P. Grosskopf, Rockford, IL (US); Eric A. Brust, Maachesney Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 72 days.

(21) Appl. No.: 12/494,352

(22) Filed: Jun. 30, 2009

(65) Prior Publication Data

US 2010/0327684 A1    Dec. 30, 2010

(51) Int. Cl.
*F16H 55/02* (2006.01)
*F16H 55/08* (2006.01)
*H02K 7/10* (2006.01)

(52) U.S. Cl. ............................................. 74/462; 310/83

(58) Field of Classification Search ................ 310/75 R, 310/83, 96, 99; 74/457–460, 462; 417/423.1; 29/893.3
See application file for complete search history.

(56) References Cited

U.S. PATENT DOCUMENTS

| | | | | |
|---|---|---|---|---|
| 3,765,303 A | * | 10/1973 | Fischer et al. | 409/31 |
| 3,881,364 A | * | 5/1975 | Rouverol | 74/462 |
| 3,918,315 A | * | 11/1975 | Rouverol | 74/462 |
| 4,108,017 A | * | 8/1978 | Rouverol | 74/462 |
| 4,825,715 A | * | 5/1989 | Buczek et al. | 74/462 |
| 4,969,371 A | * | 11/1990 | Allen | 74/462 |
| 4,974,467 A | | 12/1990 | Cundy | |
| 5,152,141 A | | 10/1992 | Rumford et al. | |
| 5,184,465 A | | 2/1993 | Howard et al. | |
| 6,155,136 A | | 12/2000 | Telly et al. | |
| 6,396,165 B1 | | 5/2002 | Nagano et al. | |
| 6,571,655 B2 | * | 6/2003 | Tanaka | 74/462 |
| 6,656,079 B2 | | 12/2003 | Eulenstein et al. | |
| 6,836,086 B1 | | 12/2004 | Goldberg et al. | |
| 6,838,778 B1 | | 1/2005 | Kandil et al. | |
| 6,838,779 B1 | | 1/2005 | Kandil et al. | |
| 7,208,854 B1 | | 4/2007 | Saban et al. | |
| 7,389,712 B2 | | 6/2008 | Himmelmann | |

FOREIGN PATENT DOCUMENTS

| | | | | |
|---|---|---|---|---|
| JP | 2001271889 A | * | 10/2001 | |
| JP | 2006090466 A | * | 4/2006 | |

* cited by examiner

*Primary Examiner* — Tran N Nguyen
(74) *Attorney, Agent, or Firm* — Carlson, Gaskey & Olds PC

(57) ABSTRACT

A gear set for a generator includes a first gear having a first set of involute teeth and a second gear having a second set of involute teeth circumferentially located about a center axis of rotation. Each set of involute teeth includes respective roll angles, $\epsilon_{A-D}$. For a diametrically smaller one of the first gear and the second gear the roll angle $\epsilon_A$ is 1.51°-3.51°, the roll angle $\epsilon_B$ is 7.64°-9.64°, the roll angle $\epsilon_C$ is 26.03°-28.03°, and the roll angle $\epsilon_D$ is 32.16°-34.16°, and for a diametrically larger one of the first gear and the second gear the roll angle $\epsilon_A$ is 15.02°-17.02°, the roll angle $\epsilon_B$ is 16.7°-18.7°, the roll angle $\epsilon_C$ is 21.73°-23.73°, and the roll angle $\epsilon_D$ is 23.41°-25.41°.

18 Claims, 2 Drawing Sheets

IDLER GEAR FOR A GENERATOR

BACKGROUND OF THE INVENTION

This disclosure relates to a modified gear set for handling the expected stresses within a generator.

Electrical generators typically include a shaft that is driven for rotation and which carries a plurality of field coils or permanent magnets. The generator may be used to also drive a hydraulic pump, such as for cooling the generator or other components of a system. A gear train may be used between the generator and the hydraulic pump. Misalignment of the gears within the gear train relative to the shafts, bearings, or other components, may increase wear on the gears and contribute to a reduction in gear durability. For instance, axial misalignment of the gears may cause uneven wear of the gear teeth and eventually necessitate replacement.

SUMMARY OF THE INVENTION

An exemplary gear set for a generator includes a first gear having a first set of involute teeth circumferentially located about a center axis of rotation. A second gear is axially spaced from the first gear and coupled with the first gear such that the first gear and the second gear co-rotate. The second gear has a second set of involute teeth circumferentially located about the center axis of rotation. Each set of involute teeth includes respective roll angles, $\epsilon_{A-D}$. For a diametrically smaller one of the first gear and the second gear the roll angle $\epsilon_A$ is 1.51°-3.51°, the roll angle $\epsilon_B$ is 7.64°-9.64°, the roll angle $\epsilon_C$ is 26.03°-28.03°, and the roll angle $\epsilon_D$ is 32.16°-34.16°, and for a diametrically larger one of the first gear and the second gear the roll angle $\epsilon_A$ is 15.02°-17.02°, the roll angle $\epsilon_B$ is 16.7°-18.7°, the roll angle $\epsilon_C$ is 21.73°-23.73°, and the roll angle $\epsilon_D$ is 23.41°-25.41°.

In embodiments, the gear set may be part of a gear train of generator for driving a pump. The gear train may include a rotor gear mounted on a rotor shaft of the generator and intermeshed with the second gear of the gear set and a pump gear intermeshed with the first gear of the gear set. A rotor is mounted on the rotor shaft within a stator having a plurality of magnetic members circumferentially spaced around the rotor shaft.

An exemplary method for processing a gear set for a generator may include disassembling at least a portion of the generator and inserting a gear set into the generator which has the desired roll angles $\epsilon_{A-D}$.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
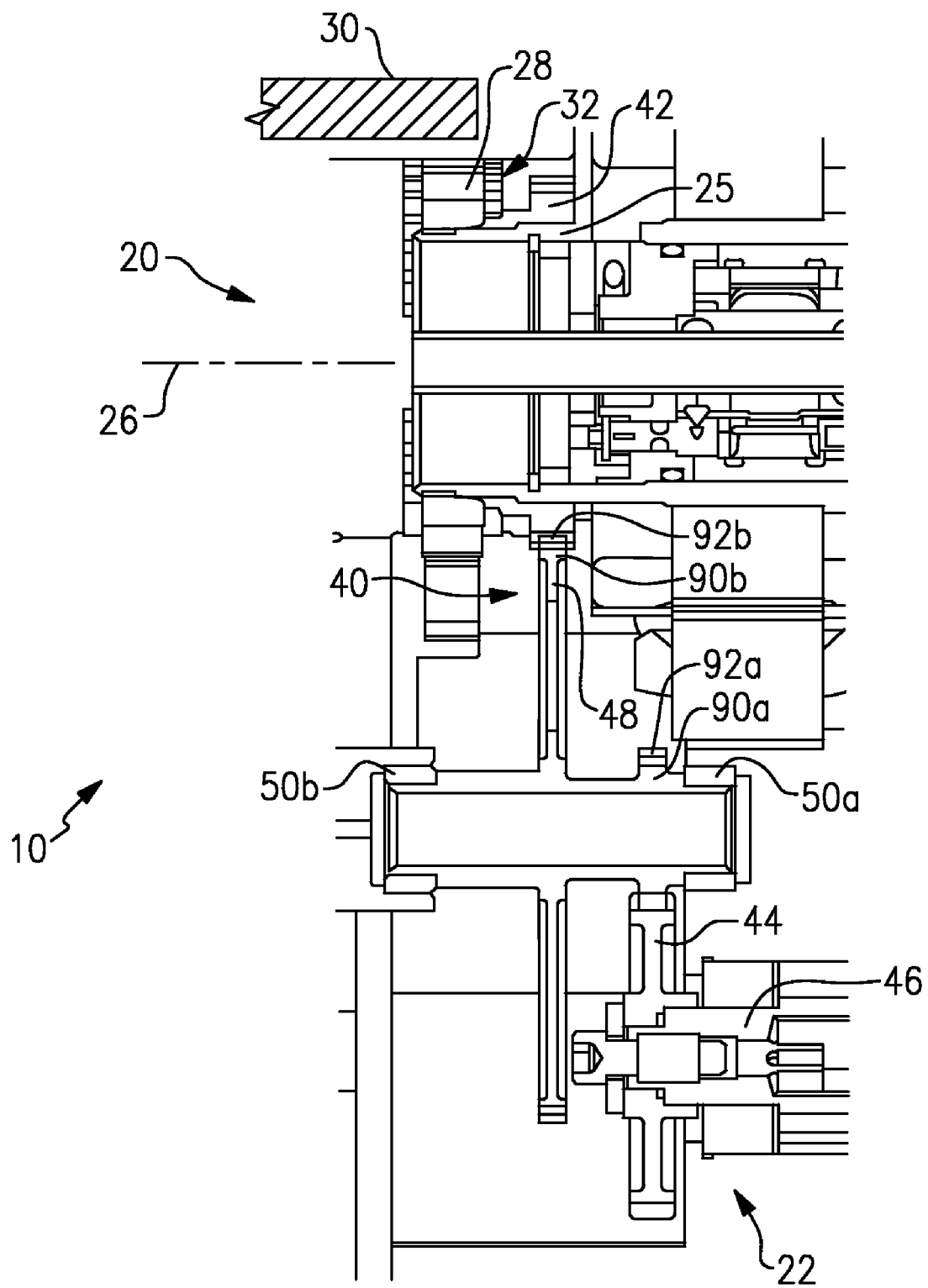
FIG. 1 illustrates an example generator having a pump and a gear train.

FIG. 1 illustrates selected portions of an example generator 10. For instance, the generator 10 may be a high speed, variable frequency generator for starting a turbine engine and generating electric current when being driven by the turbine engine.

In the illustrated example, the generator 10 includes a dynamoelectric portion 20, a hydraulic pump 22, and an idler gear, or gear set, 48 between the hydraulic pump 22 and the dynamoelectric portion 20. The dynamoelectric portion 20 includes a rotor shaft 25 that is rotatable about a central axis 26. A rotor 28 is mounted on the rotor shaft 25 to be driven about the central axis 26 within a stator 30 (shown in part). The rotor 28 includes a plurality of magnetic members 32, such as field coils or permanent magnets, circumferentially spaced about the rotor 28 relative to the central axis 26. The general arrangement of dynamoelectric machines is known and may vary from that shown in the illustrated examples.

The generator 10 includes a gear train 40 for driving the hydraulic pump 22 via the dynamoelectric portion 20. In this case, the gear train 40 is a gear reduction train to drive the hydraulic pump 22 at a relatively slower speed than the dynamoelectric portion 20. However, the gear train 40 may be modified in other examples.

The gear train 40 includes a rotor gear 42 mounted on the rotor shaft 25, a pump gear 44 mounted on a pump shaft 46 of the hydraulic pump 22, and the gear set 48 mounted for rotation on journal bearings 50a and 50b. In this case, the dimensions of the journal bearings 50a and 50b may vary from part to part through normal manufacturing processes, design tolerances, or both such that there is possible position variation of the gear set 48 riding in the journal bearings 50a and 50b, depending on the particular dimensions of the journal bearings 50a and 50b. However, as will be described, the exemplary gear set 48 is configured to facilitate reducing any effects from the dimensional variations of the journal bearings 50a and 50b.

The gear set 48 includes a first gear 90a and a second gear 90b. The first gear 90a includes a first set of involute gear teeth 92a that intermesh with teeth of the pump gear 44 and the second gear 90b includes a second set of involute gear teeth 92b that intermesh with teeth of the rotor gear 42.

Figure 2:
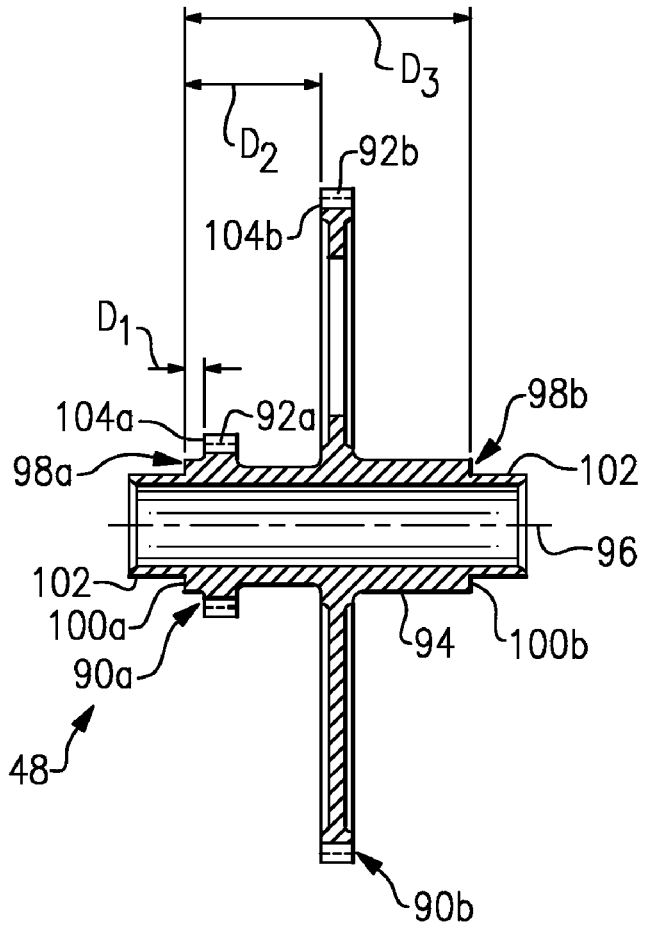
FIG. 2 illustrates a sectional view of an example idler gear of the gear train in FIG. 1.

Referring to FIG. 2, the first gear 90a and the second gear 90b are coupled to a common shaft 94 for rotation about a central axis 96. As an example, the shaft 94, first gear 90a, and second gear 90b may be a single, unitary component. The shaft 94 includes a first shoulder 98a near one end of the shaft 94 and a second shoulder 98b near the other end of the shaft 94. The first gear 90a and the second gear 90b are located axially between the shoulders 98a and 98b.

The shoulders 98a and 98b include respective axial faces 100a and 100b, which facilitate locating the gear set 48 relative to the journal bearings 50a and 50b. For instance, the axial face 100a abuts the journal bearing 50a and the axial face 100b abuts the journal bearing 50b. The shoulders 98a and 98b thereby set the axial position of the gear set 48. Bearing surfaces 102 at each end of the shaft 94 ride within the journal bearings 50a and 50b to rotatably support the gear set 48.

The shoulders 98a and 98b facilitate reducing any effects from the dimensional variations of the journal bearings 50a and 50b by axially locating the first gear 90a and the second gear 90b relative to each other and the shoulder 98a. The gear set 48 includes a first axial distance, $D_1$, between the axial face 100a of shoulder 98a and an axial face 104a of the first set of involute gear teeth 92a. A second axial distance, $D_2$, extends between the axial face 100a of shoulder 98a and an axial face 104b of the second set of involute gear teeth 92b. A third axial distance, $D_3$, extends between the axial face 100a of shoulder 98a and the axial face 100b of the shoulder 98b.

Thus, even if there is dimensional variation in the bearing surfaces of the journal bearings 50a and 50b, the shoulder 98a, through abutment with the journal bearing 50a in this case, functions as a locator to control the axial position of the first gear 90a and second gear 90b.

In the disclosed example, the gear set 48 includes a predetermined ratio between $D_1$ and $D_2$ to facilitate axially locating the first gear 90a and the second gear 90b. As an example, the ratio may be 0.1-0.2. That is, the distance $D_1$ divided by the distance $D_2$ equals 0.1-0.2. In a further example, the ratio may be 0.14-0.15.

In some examples, $D_1$ may be 0.117-0.127 inches (0.297-0.323 centimeters) and $D_2$ may be 0.853-0.863 inches (2.17-2.19 centimeters) to achieve a ratio within the desired range. The distance $D_3$ may be 1.806-1.810 inches (4.587-4.597 centimeters).

Figure 3:
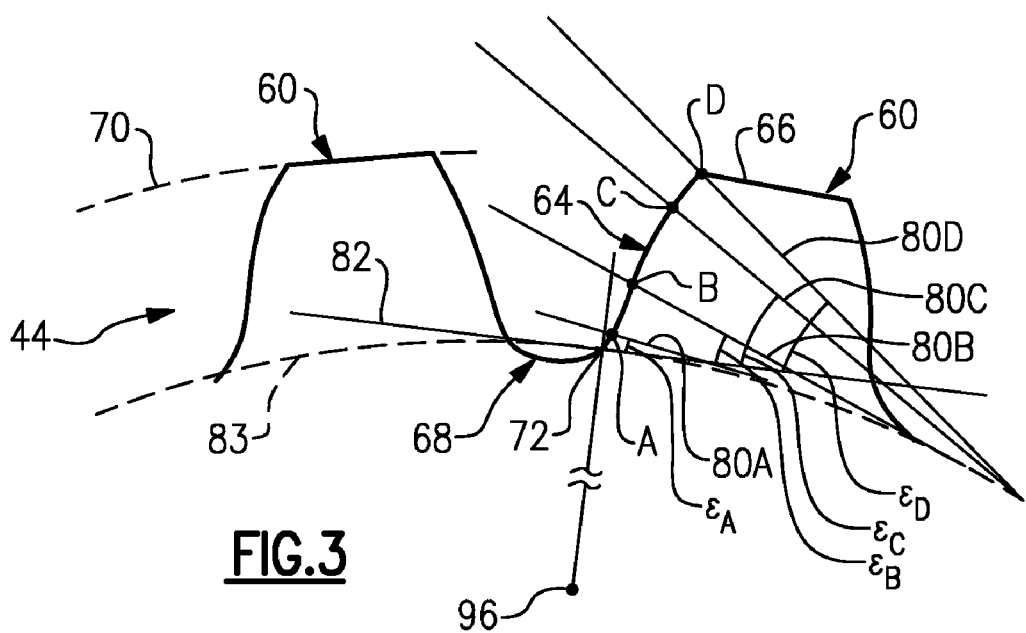
FIG. 3 illustrates gear teeth of an idler gear.

Each tooth of the first set of involute teeth 92a has a first gear tooth profile and each tooth of the second set of involute teeth 92b has a second gear tooth profile that is different than the first gear tooth profile. For instance, the selected tooth profiles facilitate increasing the durability of the gear set 48. Referring to FIG. 3, the first set of gear teeth 92a and the second set of gear teeth 92b (collectively the teeth 60) are designed with a profile that accommodates the specific loads expected from the high rotational speeds of the gear train 40. In this case, the teeth 60 are involute teeth that each include at least one involute surface 64 that extends between a tooth tip 66 and a tooth base 68. As an example, the tooth tips 66 may be the surfaces or points of the teeth 60 that form the outermost diameter 70 of the rotor gear 42.

Each involute surface 64 may terminate on a radially outer end at the tip 66 and at a radially inner end at a point 72 near the base 68. For instance, the point 72 may represent the point at which the involute surface 64 inflects to form a valley between neighboring teeth 60.

In profile, the involute surface 64 includes at least reference points A-D thereon, with reference point A near the base 68, reference point D near the tip 66, reference point B between reference points A and D, and reference point C being between reference points B and D. In embodiments, reference point A may essentially be at the point 72 of the terminal end of the involute surface 64 and reference point D may essentially be at the radially outer terminal end of the involute surface 64. In some examples, the locations of reference points B and C may be a function of a distance between reference points A and D. In one example, reference point B is located 20% of the distance (from reference point A), and reference point C is located 80% of the distance (from reference point A).

Each of the reference points A-D includes an associated roll angle, $\epsilon_{A\text{-}D}$, between a corresponding first line 80A-D and a second line 82 that is tangent at the point 72 to a reference base circle 83 having a center origin at the center axis 96. For instance, the roll angles $\epsilon_{A\text{-}D}$ are subtended by a portion of the involute surface 64. The locations of the reference points A-D and the magnitudes of the roll angles $\epsilon_{A\text{-}D}$ may be determined using a known involute-checking machine.

The following examples suppose that reference point A is at the point 72 of the terminal end of the involute surface 64, reference point D is at the radially outer terminal end of the involute surface 64, reference point B is located 20% of the distance (from reference point A), and reference point C is located 80% of the distance (from reference point A). In one example, the roll angles $\epsilon_{A\text{-}D}$ of the first gear 90a are different than the roll angles $\epsilon_{A\text{-}D}$ of the second gear 90b. That is, the first gear tooth profile is tailored to accommodate the specific loads expected on the first gear 90a and the second gear tooth profile is tailored to accommodate the specific loads expected on the second gear 90b, which may be different from the loads on the first gear 90a.

In the illustrated example, the gear set 48 includes ratios of the roll angles $\epsilon_{A\text{-}D}$ for the teeth of the first gear 90a to the roll angles $\epsilon_{A\text{-}D}$ of the teeth of the second gear 90b. For instance, a first ratio of the roll angle $\epsilon_A$ of the first set of gear teeth 92a to the roll angle $\epsilon_A$ of the second set of gear teeth 92b may be 0.08-0.24, a second ratio of the roll angle $\epsilon_B$ of the first set of gear teeth 92a to the roll angle $\epsilon_B$ of the second set of gear teeth 92b may be 0.4-0.58, a third ratio of the roll angle $\epsilon_C$ of the first set of gear teeth 92a to the roll angle $\epsilon_C$ of the second set of gear teeth 92b may be 1.09-1.29, and a fourth ratio of the roll angle $\epsilon_D$ of the first set of gear teeth 92a to the roll angle $\epsilon_D$ of the second set of gear teeth 92b may be 1.26-1.46. In a further example, the first ratio may be 0.12-0.2, the second ratio may be 0.44-0.54, the third ratio may be 1.14-1.24, and the fourth ratio may be 1.31-1.41. In a further example, the first ratio may be 0.16, the second ratio may be 0.49, the third ratio may be 1.19, and the fourth ratio may be 1.36.

The above ratios may be achieved using the following exemplary roll angles $\epsilon_{A\text{-}D}$. For instance, the roll angle $\epsilon_A$ is 1.51°-3.51°, the roll angle $\epsilon_B$ is 7.64°-9.64°, the roll angle $\epsilon_C$ is 26.03°-28.03°, and the roll angle $\epsilon_D$ is 32.16°-34.16° for the first gear 90a, which is diametrically smaller than the second gear 90b. For the diametrically larger second gear 90b, the roll angle $\epsilon_A$ is 15.02°-17.02°, the roll angle $\epsilon_B$ is 16.7°-18.7°, the roll angle $\epsilon_C$ is 21.73°-23.73°, and the roll angle $\epsilon_D$ is 23.41°-25.41°.

Utilizing roll angles $\epsilon_{A\text{-}D}$ within the given ranges for the first gear 90a and the second gear 90b provides a profile of the involute surface 64 that accommodates the expected specific loads on the gear set 48 for the expected rotational speeds of the generator 10. That is, the radian measures of the given roll angles $\epsilon_{A\text{-}D}$ are the tangents of the pressure angles at the points on the involute surface 64 and are designed through the given roll angles $\epsilon_{A\text{-}D}$ to accommodate a particular stress state on the teeth 60.

In a further example, the roll angle $\epsilon_A$ is 2.01°-3.01°, the roll angle $\epsilon_B$ is 8.14°-9.14°, the roll angle $\epsilon_C$ is 26.53°-27.53°, and the roll angle $\epsilon_D$ is 32.66°-33.66° for the first gear 90a. In a further example, the roll angle $\epsilon_A$ is 2.51°, the roll angle $\epsilon_B$ is 8.64°, the roll angle $\epsilon_C$ is 27.03°, and the roll angle $\epsilon_D$ is 33.16° for the first gear 90a.

In a further example for the second gear 90b, the roll angle $\epsilon_A$ is 15.52°-16.52°, the roll angle $\epsilon_B$ is 17.2°-18.2°, the roll angle $\epsilon_C$ is 22.23°-23.23°, and the roll angle $\epsilon_D$ is 23.91°-24.91°. In a further example, the roll angle $\epsilon_A$ is 16.02°, the roll angle $\epsilon_B$ is 17.7°, the roll angle $\epsilon_C$ is 22.73°, and the roll angle $\epsilon_D$ is 24.41° for the second gear 90b. In some examples, the exemplary gear set 48 may be used in combination with the rotor gear disclosed in U.S. application Ser. No. 12/436,190 entitled ROTOR GEAR FOR GENERATOR and the pump gear disclosed in U.S. application Ser. No. 12/436,193 entitled PUMP GEAR AND PUMP ASSEMBLY FOR A GENERATOR. The gear set 48 may also include features of the idler gear disclosed in U.S. application Ser. No. 12/437,567 entitled IDLER GEAR AND JOURNAL BEARING ASSEMBLY FOR A GENERATOR.

The gear set 48 may be formed with the desired roll angles in a known gear manufacturing process. For instance, the process may include casting, forging, powder metallurgy, and/or machining from a blank. Thus, the process for forming the gear set 48 is not limited to any particular type as long as the selected process is capable of establishing the roll angles to be within the given example ranges.

The gear set 48 may be incorporated into the generator 10 as part of a method of installing the gear train 40. For instance, the gear set 48 may be a replacement to a prior gear set in the generator 10 that is an original component or a worn component that is to be replaced. In this case, the generator 10 may be at least partially disassembled in a known manner, and the gear set 48 may then be inserted into the generator 10 in place of the prior gear set.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gear set for a generator, comprising:
   a first gear having a first set of involute teeth circumferentially located about a center axis of rotation; and
   a second gear axially spaced from the first gear and coupled with the first gear such that the first gear and the second gear co-rotate, the second gear having a second set of involute teeth circumferentially located about the center axis of rotation, each tooth of the first set of involute teeth and the second set of involute teeth including an involute surface that extends between a tooth tip and a tooth base, each involute surface including at least reference points A-D thereon with reference point A near the base, reference point D near the tip, reference point B between reference points A and D, and reference point C between reference points B and D, the reference points A-D having respective roll angles, $\epsilon_{A\text{-}D}$, between a corresponding first line that is perpendicular to the involute surface at the given reference point A-D and a second line that is tangent at a reference point that lies on a terminal end of the involute surface at the tooth base to a reference base circle having a center origin at the center axis, for a diametrically smaller one of the first gear and the second gear the roll angle $\epsilon_A$ is 1.51°-3.51°, the roll angle $\epsilon_B$ is 7.64°-9.64°, the roll angle $\epsilon_C$ is 26.03°-28.03°, and the roll angle $\epsilon_D$ is 32.16°-34.16°, and for a diametrically larger one of the first gear and the second gear the roll angle $\epsilon_A$ is 15.02°-17.02°, the roll angle $\epsilon_B$ is 16.7°-18.7°, the roll angle $\epsilon_C$ is 21.73°-23.73°, and the roll angle $\epsilon_D$ is 23.41°-25.41°.

2. The gear set as recited in claim 1, wherein the roll angle $\epsilon_A$ is 2.01°-3.01°, the roll angle $\epsilon_B$ is 8.14°-9.14°, the roll angle $\epsilon_C$ is 26.53°-27.53°, and the roll angle $\epsilon_D$ is 32.66°-33.66° for the diametrically smaller one of the first gear and the second gear.

3. The gear set as recited in claim 1, wherein the roll angle $\epsilon_A$ is 2.51°, the roll angle $\epsilon_B$ is 8.64°, the roll angle $\epsilon_C$ is 27.03°, and the roll angle $\epsilon_D$ is 33.16° for the diametrically smaller one of the first gear and the second gear.

4. The gear set as recited in claim 1, wherein the roll angle $\epsilon_A$ is 15.52°-16.52°, the roll angle $\epsilon_B$ is 17.2°-18.2°, the roll angle $\epsilon_C$ is 22.23°-23.23°, and the roll angle $\epsilon_D$ is 23.91°-24.91° for the diametrically larger one of the first gear and the second gear.

5. The gear set as recited in claim 1, wherein the roll angle $\epsilon_A$ is 16.02°, the roll angle $\epsilon_B$ is 17.7°, the roll angle $\epsilon_C$ is 22.73°, and the roll angle $\epsilon_D$ is 24.41° for the diametrically larger one of the first gear and the second gear.

6. The gear set as recited in claim 1, wherein a first ratio of the roll angle $\epsilon_A$ of the first set of involute teeth to the roll angle $\epsilon_A$ of the second set of involute teeth is 0.08-0.24, a second ratio of the roll angle $\epsilon_B$ of the first set of involute teeth to the roll angle $\epsilon_B$ of the second set of involute teeth is 0.4-0.58, a third ratio of the roll angle $\epsilon_C$ of the first set of involute teeth to the roll angle $\epsilon_C$ of the second set of involute teeth is 1.09-1.29, and a fourth ratio of the roll angle $\epsilon_D$ of the first set of involute teeth to the roll angle $\epsilon_D$ of the second set of involute teeth is 1.26-1.46.

7. The gear set as recited in claim 6, wherein the first ratio is 0.12-0.2, the second ratio is 0.44-0.54, the third ratio is 1.14-1.24, and the fourth ratio is 1.31-1.41.

8. The gear set as recited in claim 6, wherein the first ratio is 0.16, the second ratio is 0.49, the third ratio is 1.191, and the fourth ratio is 1.36.

9. The gear set as recited in claim 1, further comprising a common shaft that couples the first gear and the second gear together.

10. The gear set as recited in claim 9, wherein the common shaft includes a shoulder having an axial face.

11. The gear set as recited in claim 10, including a first axial distance between the axial face of the shoulder and an axial face of the first set of involute teeth and a second axial distance between the axial face of the shoulder and an axial face of the second set of involute teeth, and a ratio of the first axial distance to the second axial distance is 0.1-0.2.

12. The gear set as recited in claim 11, wherein the ratio of the first axial distance to the second axial distance is 0.14-0.15.

13. The gear set as recited in claim 10, including a first axial distance between the axial face of the shoulder and an axial face of the first set of involute teeth that is 0.117-0.127 inches and a second axial distance between the axial face of the shoulder and an axial face of the second set of involute teeth that is 0.853-0.863.

14. The gear set as recited in claim 10, wherein the common shaft further comprises another shoulder, and the first gear and the second gear are each located axially between the shoulders.

15. A generator comprising:
   a stator;
   a rotor shaft that is rotatable;
   a rotor mounted on the rotor shaft to be driven within the stator and having a plurality of magnetic members circumferentially spaced around the rotor shaft;
   a gear train including a rotor gear mounted on the rotor shaft, a gear set engaged with the rotor gear, and a pump gear operative to be driven by the rotor gear through the gear set;
   a pump operatively coupled to the rotor shaft through the pump gear of the gear train, and
   the gear set including a first gear intermeshed with the pump gear and a second gear intermeshed with the rotor gear, the first gear having a first set of involute teeth circumferentially located about a center axis of rotation, the second gear is axially spaced from the first gear and coupled with the first gear such that the first gear and the second gear co-rotate, the second gear having a second set of involute teeth circumferentially located about the center axis of rotation, each tooth of the first set of involute teeth and the second set of involute teeth including an involute surface that extends between a tooth tip and a tooth base, each involute surface including at least reference points A-D thereon with reference point A near the base, reference point D near the tip, reference point B between reference points A and D, and reference point C between reference points B and D, the reference points A-D having respective roll angles, $\epsilon_{A-D}$, between a corresponding first line that is perpendicular to the involute surface at the given reference point A-D and a second line that is tangent at a reference point that lies on a terminal end of the involute surface at the tooth base to a reference base circle having a center origin at the center axis, for a diametrically smaller one of the first gear and the second gear the roll angle $\epsilon_A$ is 1.51°-3.51°, the roll angle $\epsilon_B$ is 7.64°-9.64°, the roll angle $\epsilon_C$ is 26.03°-28.03°, and the roll angle $\epsilon_D$ is 32.16°-34.16°, and for a diametrically larger one of the first gear and the second gear the roll angle $\epsilon_A$ is 15.02°-17.02°, the roll angle $\epsilon_B$ is 16.7°-18.7°, the roll angle $\epsilon_C$ is 21.73°-23.73°, and the roll angle $\epsilon_D$ is 23.41°-25.41°.

16. The generator as recited in claim 15, wherein and a first ratio of the roll angle $\epsilon_A$ of the first set of involute teeth to the roll angle $\epsilon_A$ of the second set of involute teeth is 0.08-0.24, a second ratio of the roll angle $\epsilon_B$ of the first set of involute teeth to the roll angle $\epsilon_B$ of the second set of involute teeth is 0.4-0.58, a third ratio of the roll angle $\epsilon_C$ of the first set of involute teeth to the roll angle $\epsilon_C$ of the second set of involute teeth is 1.09-1.29, and a fourth ratio of the roll angle $\epsilon_D$ of the first set of involute teeth to the roll angle $\epsilon_D$ of the second set of involute teeth is 1.26-1.46.

17. The generator as recited in claim 15, further comprising a common shaft that couples the first gear and the second gear together, the common shaft including a shoulder having an axial face and a first axial distance between the axial face of the shoulder and an axial face of the first set of involute teeth and a second axial distance between the axial face of the shoulder and an axial face of the second set of involute teeth, and a ratio of the first axial distance to the second axial distance is 0.1-0.2.

18. A method for installing a gear train in a generator, comprising:

disassembling at least a portion of a generator that includes a stator, a rotor shaft that is rotatable, a rotor mounted on the rotor shaft to be driven within the stator and having a plurality of magnetic members circumferentially spaced around the rotor shaft, a gear train including a rotor gear mounted on the rotor shaft, a first gear set engaged with the rotor gear, and a pump gear operative to be driven by the rotor gear through the gear set, and a pump operatively coupled to the rotor shaft through the pump gear of the gear train; and inserting a second gear set into the generator in place of the first gear set, the second gear set including a first gear intermeshed with the pump gear and a second gear intermeshed with the rotor gear, the first gear having a first set of involute teeth circumferentially located about a center axis of rotation, the second gear is axially spaced from the first gear and coupled with the first gear such that the first gear and the second gear co-rotate, the second gear having a second set of involute teeth circumferentially located about the center axis of rotation, each tooth of the first set of involute teeth and the second set of involute teeth including an involute surface that extends between a tooth tip and a tooth base, each involute surface including at least reference points A-D thereon with reference point A near the base, reference point D near the tip, reference point B between reference points A and D, and reference point C between reference points B and D, the reference points A-D having respective roll angles, $\epsilon_{A-D}$, between a corresponding first line that is perpendicular to the involute surface at the given reference point A-D and a second line that is tangent at a reference point that lies on a terminal end of the involute surface at the tooth base to a reference base circle having a center origin at the center axis, and for a diametrically smaller one of the first gear and the second gear the roll angle $\epsilon_A$ is 1.51°-3.51°, the roll angle $\epsilon_B$ is 7.64°-9.64°, the roll angle $\epsilon_C$ is 26.03°-28.03°, and the roll angle $\epsilon_D$ is 32.16°-34.16°, and for a diametrically larger one of the first gear and the second gear the roll angle $\epsilon_A$ is 15.02°-17.02°, the roll angle $\epsilon_B$ is 16.7°-18.7°, the roll angle $\epsilon_C$ is 21.73°-23.73°, and the roll angle $\epsilon_D$ is 23.41°-25.41°.

* * * * *